US009540497B2

(12) United States Patent
Lipkin et al.

(10) Patent No.: US 9,540,497 B2
(45) Date of Patent: Jan. 10, 2017

(54) SILICON-BASED REPAIR METHODS AND COMPOSITION

(71) Applicant: GENERAL ELECTRIC COMPANY, Schenectady, NY (US)

(72) Inventors: Don Mark Lipkin, Niskayuna, NY (US); Nicholas Edward Antolino, Schenectady, NY (US); David Poerschke, Santa Barbara, CA (US); Kevin Paul McEvoy, Canton, MI (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 14/589,021

(22) Filed: Jan. 5, 2015

(65) Prior Publication Data
US 2016/0194476 A1 Jul. 7, 2016

(51) Int. Cl.
*C08K 3/34* (2006.01)
*B29C 73/02* (2006.01)
*C09D 183/04* (2006.01)
*C08K 3/36* (2006.01)
*C08K 3/22* (2006.01)

(52) U.S. Cl.
CPC ............. *C08K 3/34* (2013.01); *B29C 73/02* (2013.01); *C08K 3/36* (2013.01); *C09D 183/04* (2013.01); *C08K 2003/221* (2013.01); *C08K 2003/2213* (2013.01)

(58) Field of Classification Search
CPC ....... C08K 3/34; C08K 3/36; C08K 2003/221; C08K 2003/2213; C09D 184/04
See application file for complete search history.

(56) References Cited

U.S. PATENT DOCUMENTS

| 4,451,504 A * | 5/1984 | Gallaro | H01J 9/146 427/64 |
|---|---|---|---|
| 5,985,368 A | 11/1999 | Sangeeta et al. | |
| 7,476,703 B2 | 1/2009 | Ruud et al. | |
| 2004/0214938 A1* | 10/2004 | Ruud | C04B 35/481 524/431 |
| 2007/0141369 A1 | 6/2007 | Hazel et al. | |
| 2009/0162556 A1 | 6/2009 | Boutwell et al. | |
| 2011/0027558 A1 | 2/2011 | Kirby et al. | |
| 2011/0062469 A1* | 3/2011 | Camras | H01L 33/58 257/98 |
| 2011/0229632 A1 | 9/2011 | Kirby et al. | |
| 2012/0052294 A1* | 3/2012 | Poulet | C09D 5/084 428/336 |
| 2012/0076943 A1 | 3/2012 | Kirby et al. | |
| 2012/0126274 A1* | 5/2012 | Jagt | C08K 3/0008 257/98 |
| 2015/0056625 A1* | 2/2015 | Pautz | B01D 17/047 435/6.12 |
| 2016/0108216 A1* | 4/2016 | Cartier | C04B 35/63492 524/229 |
| 2016/0108510 A1 | 4/2016 | Kirby et al. | |

FOREIGN PATENT DOCUMENTS

EP 1173392 A1 1/2002

OTHER PUBLICATIONS

Kirby et al; "Compositions and Methods for Thermal Spraying a Hermetic Rare Earth Environmental Barrier Coating," Pending U.S. Appl. No. 14/204,367, filed Mar. 11, 2014.
Anonymous: "Group (periodic table)—Wikipedia. The free encyclopedia", Jan. 5, 2015 (Jan. 5, 2015), pp. 1-4, XP055160094,Retrieved from the Internet: URL: http://en.wikipedia.org/w/index.php?title=Group (periodic table &printable=yes [retrieved on Jan. 6, 2015].
European Search Report issued in connection with European Application No. EP15201549 on Apr. 28, 2016.

* cited by examiner

*Primary Examiner* — Margaret Moore
(74) *Attorney, Agent, or Firm* — John P. Darling

(57) ABSTRACT

There is set forth herein a silicon-based patch formulation comprising about 25 to 66 percent by volume of a solvent; about 4 to 10 percent by volume of a silicon-comprising binding material; and about 30 to 65 percent by volume of a patching material, the patching material comprising particles having one or more non-actinide Group IIIA elements, wherein a molar ratio of the one or more non-actinide Group IIIA elements to silicon within the patch formulation is about 0.95 to 1.25.

21 Claims, 3 Drawing Sheets

SILICON-BASED REPAIR METHODS AND COMPOSITION

BACKGROUND

The present disclosure relates generally to repairing of cavities disposed within silicon-based substrates. More specifically, the present disclosure relates to silicon-based patch formulations for use, for instance, with repairing of cavities within silicon-based substrates and resultant patch materials therefrom.

Silicon-based ceramic materials are currently being employed for high temperature components of gas turbine engines such as, for instance, airfoils (e.g. blades and vanes), combustor liners and shrouds. By way of example, silicon-based ceramic materials, for instance, ceramic matrix composites (CMCs) may include or be fabricated of fibers reinforcing a ceramic matrix phase. CMCs may, for instance, provide a desirable combination of high temperature mechanical, physical and/or chemical properties compared to other conventional materials such as, for instance, iron, nickel and/or cobalt-based superalloys.

Although silicon-based ceramic materials exhibit desirable high temperature characteristics, such materials can suffer from rapid recession in combustion environments due to volatilization upon exposure to reactive species such as water vapor. In such cases, protective coatings, commonly referred to herein as environmental barrier coatings (EBC), are used to protect the silicon-based ceramic materials from volatilization processes.

BRIEF DESCRIPTION

There is set forth herein a silicon-based patch formulation comprising about 25 to 66 percent by volume of a solvent; about 4 to 10 percent by volume of a silicon-comprising binding material; and about 30 to 65 percent by volume of a patching material, the patching material comprising particles having one or more non-actinide Group IIIA elements, wherein a molar ratio of the one or more non-actinide Group IIIA elements to silicon within the patch formulation is about 0.95 to 1.25.

In another embodiment, there is set forth herein a silicon-based environmentally resistant patch comprising about 2 to 10 percent by volume of a cured binding material, wherein the cured binding material comprises a cured silicon-based binding material; and about 90 to 98 percent by volume of a cured patching material, wherein the cured patching material comprises particles having one or more non-actinide Group IIIA materials; and wherein a molar ratio of one or more non-actinide Group IIIA element to silicon within the environmentally resistant patch material is about 0.95 to 1.25.

In yet another embodiment, there is set forth herein a method which includes heat treating a silicon-based patch formulation disposed within a cavity of a silicon-based substrate, the heat treating facilitating forming a silicon-based environmentally-resistant patch within the cavity, wherein the silicon-based environmentally-resistant patch including a cured silicon-comprising binding material and a cured patching material comprising particles having one or more non-actinide Group IIIA elements, and wherein a molar ratio of one or more non-actinide Group IIIA elements to silicon within the silicon-based environmentally-resistant patch is about 0.95 to 1.25.

DRAWINGS

Figure 2:
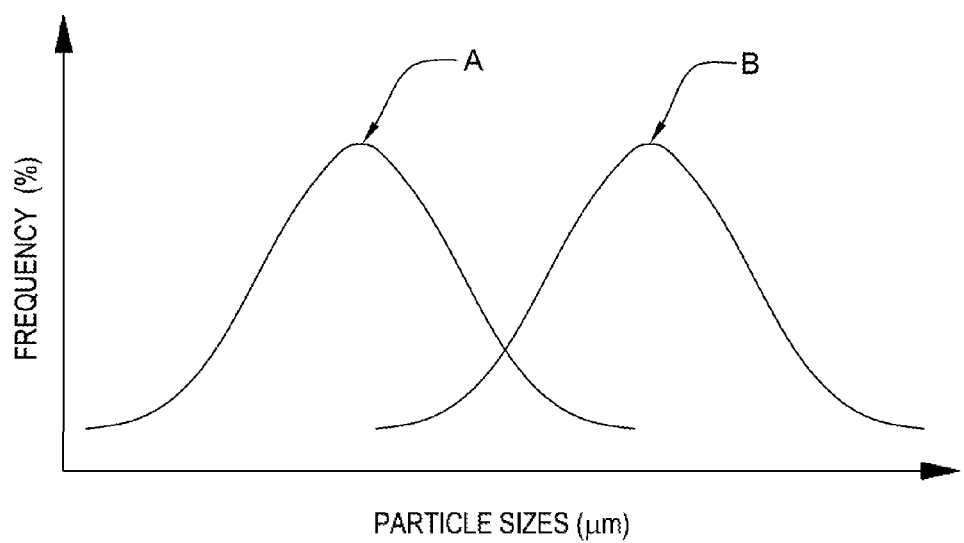
Figure 3:
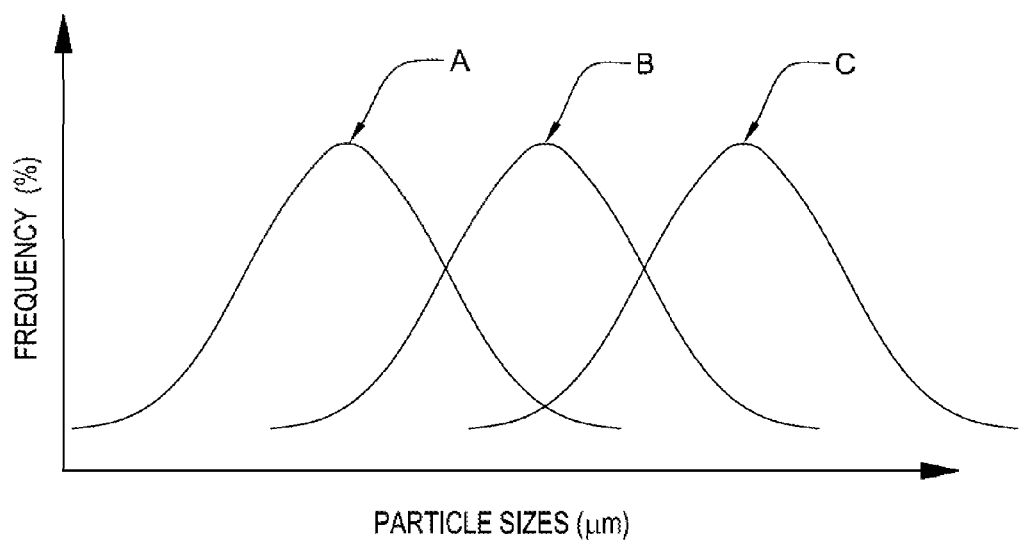

FIG. 2 depicts a schematic bimodal particle size distribution graph of particles having non-actinide Group IIIA elements within a patching material, in accordance with one or more aspects of the present disclosure; and FIG. 3 depicts a schematic trimodal particle size distribution graph of particles having non-actinide Group IIIA elements within a patching material, in accordance with one or more aspects of the present disclosure.

DETAILED DESCRIPTION

Disclosed herein, in part, is an enhanced patch formulation for use, for instance, with repairing of cavities within silicon-based substrates. In one aspect, as described above, a variety of silicon-based ceramic materials are currently being employed for high temperature components of gas-turbine engines. By way of example, the silicon-based ceramic materials may include or be fabricated of materials such as, for instance, silicon carbide (SiC) or silicon nitride ($Si_3N_4$) based ceramic matrix composites (CMCs). Although the silicon-based materials exhibit desirable high temperature characteristics, such materials can be rapidly consumed upon exposure to reactive species such as, for instance, water vapor by converting to volatile (gaseous) silicon hydroxide species. In such cases, protective coatings, commonly referred to herein as environmental barrier coatings (EBC) are typically used to protect the silicon-based materials from the harsh environment of high temperature engine sections. For instance, EBC materials may provide a dense, hermetic seal against water vapor in the hot combustion environment, thereby preventing recession of the ceramic component.

Although EBC materials provide desirable protection to the underlying silicon-based ceramic materials, localized spallation and/or pinhole defects may occasionally occur during conventional manufacturing processes, and/or operation. Disadvantageously, these pinhole defects and/or localized spallation can result in one or more cavities within the underlying silicon-based ceramic material. These cavities disadvantageously could grow upon prolonged exposure to hot combustion environment which, for instance, could reduce load bearing capability and/or disrupting airflow of the resultant silicon-based ceramic material which, in turn, could adversely affect operating efficiency and durability of the gas-turbine engines.

Generally stated, disclosed herein, in one aspect, is a silicon-based patch formulation for use, for instance, with repairing of cavities within silicon-based substrates. The silicon-based patch formulation includes, for instance, about 25 to 66 percent by volume of a solvent; about 4 to 10 percent by volume of a silicon-comprising binding material; and about 30 to 65 percent by volume of a patching material, the patching material comprising particles having one or more non-actinide Group IIIA elements, wherein a molar ratio of the one or more non-actinide Group IIIA elements to silicon within the patch formulation is about 0.95 to 1.25.

By way of example, the particles having one or more non-actinide Group IIIA elements comprise one or more rare earth materials selected from a group consisting of a rare earth monosilicate ($RE_2SiO_5$) and a rare earth disilicate ($RE_2Si_2O_7$), and where the rare earth material is chosen from a group consisting of non-actinide Group IIIA elements. By way of example, the non-actinide Group III elements may be or include, for instance, scandium, yttrium, terbium, dysprosium, holmium, erbium, thulium, ytterbium and lutetium. In one embodiment of the present disclosure, the particles having one or more non-actinide Group IIIA elements have at least a bimodal particle size distribution, with a particle size of a peak of a first distribution being greater than a particle size of a peak of a second distribution. For instance, a volume fraction of the first distribution may comprise fewer than 60 percent of the patching material, and a volume fraction of the second distribution may comprise fewer than 60 percent of the patching material, with a volume fraction of the first and the second distributions being substantially 100% of the patching material. In one example, the particle size of the first distribution is within a range of about 10 to 50 μm, and the particle size of the second distribution is within a range of about 0.5 to 10 μm. For instance, particles contributing to the distribution having the first peak can have an average size within a range of about 10 to 50 μm, while particles contributing to the distribution having the second peak can have an average size within a range of about 0.5 to 10 μm.

In another embodiment, the particles having one or more non-actinide Group IIIA elements have a trimodal particle size distribution, with a particle size of a peak of a first distribution being greater than a particle size of a peak of a second distribution, and the particle size of the peak of the second distribution being greater than a particle size of a peak of a third distribution. In one example, a volume fraction of the first distribution may comprise fewer than 60 percent of the patching material, a volume fraction of the second distribution may comprise fewer than 30 percent of the patching material, and a volume fraction of the third distribution may comprise fewer than 30 percent of the patching material, with a volume fraction of the first, the second and the third distributions comprising substantially 100% of the patching material. By way of example, the particle size of the first distribution is within a range of about 10 to 50 μm, the particle size of the second distribution is within a range of about 5 to 15 μm, and the particle size of the third distribution is within a range of about 0.5 to 5 μm. For instance, particles contributing to the distribution having the first peak can have an average size within a range of about 10 to 50 μm, while the particles contributing to the distribution having the second peak can have an average size within a range of about 5 to 15 μm, and particles contributing to the third peak can have an average size within a range of about 0.5 to 5 μm.

In one implementation, the solvent may include an organic solvent which facilitates dissolution of the silicon-comprising binding material. In one example, the organic solvent may be chosen from a group consisting of methanol, ethanol, butanol, propanol, pentanol, hexanol, octanol, nonanol, decanol, dodecanol. In another implementation, the binding material may include a cross-linked polyorganosiloxane resin such as, for instance, silicone resin.

In another aspect, a silicon-based environmentally resistant patch which, for instance, facilitates repairing of cavities within silicon-based substrates. The silicon-based environmentally resistant patch may include, for instance, about 2 to 10 percent by volume of a cured silicon-comprising binding material; about 90 to 98 percent by volume of a cured patching material, wherein the cured patching material may include particles having one or more non-actinide Group IIIA elements; and wherein a molar ratio of the one or more non-actinide Group IIIA elements to the silicon within the environmentally resistant patch material is about 0.95 to 1.25. By way of example, the environmentally resistant patch material may have, for instance, an adhesive strength of at least about 3 MPa and a coefficient of thermal expansion of about 3.5 to 7 ppm/° C.

In yet another aspect, there is set forth below a method which includes, for instance, heat treating a silicon-based patch formulation disposed within a cavity of a silicon-based substrate, the heat treating facilitating forming a silicon-based environmentally resistant patch within the cavity. The silicon-based environmentally-resistant patch includes a cured silicon-comprising binding material and a cured patching material comprising particles having one or more non-actinide Group IIIA elements, and where a molar ratio of one or more non-actinide Group IIIA elements to silicon within the silicon-based environmentally-resistant patch is about 0.95 to 1.25.

Reference is made below to the drawings, which are not drawn to scale for ease of understanding, wherein the same reference numbers used throughout different figures designate the same or similar components.

By way of example, FIGS. 1A-1D depict an example of an enhanced patch formulation for use, for instance, with repairing of cavities within silicon-based substrates. Advantageously, as described below, the patch formulations, upon curing, form an environmentally resistant patch material which, for instance, facilitates repairing one or more cavities disposed within silicon-based substrates, in accordance with one or more aspects of the present disclosure.

Figure 1A:
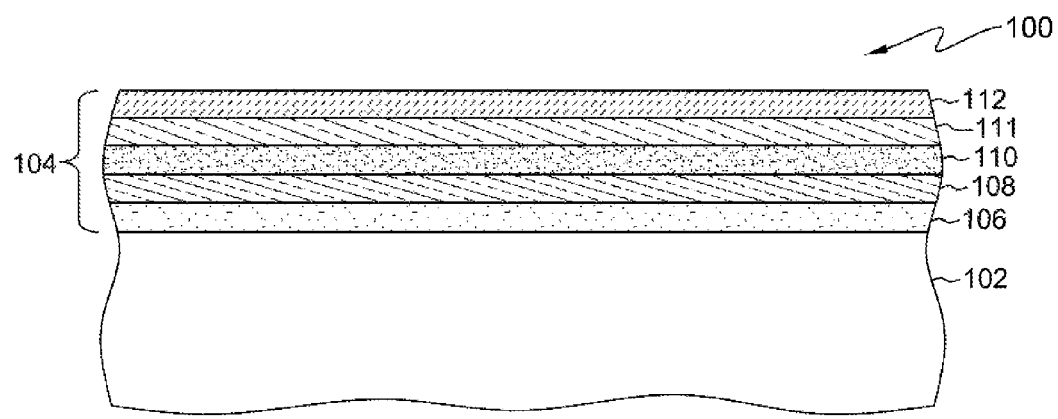
FIG. 1A is a cross-sectional view of one embodiment of a structure for use, for instance, with high temperature components, the structure including, for instance, a silicon-based substrate and an environmental barrier coating disposed over the silicon-based substrate, in accordance with one or more aspects of the present disclosure.

FIG. 1A is a cross-sectional view of one embodiment of a structure for use, for instance, with high temperature components such as, for instance, gas-turbine engines, in accordance with one or more aspects of the present disclosure. In the illustrated example, a substrate 102, which may be a silicon-based substrate is provided. By way of example, substrate 102, which may be selected for high temperature mechanical, physical, and/or chemical properties, may include any silicon-containing substrate material such as, for instance, silicon-containing ceramics (e.g., silicon carbide (SiC), silicon nitride ($Si_3N_4$)), composites comprising a SiC or $Si_3N_4$ matrix, silicon oxynitride, silicon aluminum oxynitride, a silicon containing metal alloy or intermetallic (e.g., molybdenum-silicon alloys, niobium-silicon alloys). In one example, substrate 102 may include a ceramic matrix composite (CMC), which includes a ceramic matrix reinforced with silicon carbide fibers. In another example, substrate 102 may also be a monolithic ceramic material, for instance, comprising silicon carbide, silicon nitride or combinations thereof. Note that, in one embodiment, substrate 102 may be fabricated of a materials that can be subjected to combustion environments at operating temperatures greater than about 2100° F. (1149° C.) for durations exceeding 20,000 hours.

Continuing with FIG. 1A, protective coating 104 (referred to herein as environmental barrier coating (EBC)) may be provided over substrate 102. By way of example, as described above, the protective coating provided over the silicon-based substrate advantageously facilitates inhibiting or preventing recession of the CMC material in a hot combustion environment of a gas-turbine engine, owing to oxidation and volatilization upon exposure to reactive species such as water vapor. In one example, protective coating 104 may include or be fabricated of one or more layers which include, for instance, bond coat layer 106, one or more transition layers 108, 110, 111 and an optional recession resistant surface layer 112. The various layers of FIG. 1A may be formed using a variety of different materials and a variety of fabrication techniques, such as sol-gel chemistry, plasma spray, combustion thermal spray, electrophoretic deposition, slurry dip, slurry spray, slurry painting processes, chemical vapor deposition (CVD). The thickness of the depicted layers may also vary, depending upon the particular application.

By way of example, bond coat layer 106 may be used, for instance, to inhibit chemical reactions between substrate 102 and the one or more transition layers or to promote adhesion of the EBC protective coating 104. In another embodiment, bond coat layer 106 may also be used as an oxygen barrier so as to inhibit or prevent exposure of substrate 102 to oxygen in the hot combustion environment. In one example, bond coat layer 106 may comprise elemental silicon, metal silicide or combinations thereof, and may have a thickness of about 10 to 250 m. Although not depicted in figures, a silica layer may optionally be provided over bond coat layer 106. In one example, deposited silica layer may have an initial thickness which may further increase due to the oxidation of the underlying bond coat layer.

Protective coating 104 may further include one or more transition layers 108, 110, 111 disposed over bond coat layer 106. As an example, first transition layer 108 may include rare earth silicates having a thickness of about 10 to 250 μm. In one example, rare earth silicates may be or include, for instance, rare earth monosilicate ($RE_2Si_2O_5$) or rare earth disilicate ($RE_2Si_2O_7$) or combinations thereof, with the rare earth elements being chosen from a group consisting of one or more non-actinide Group IIIA elements. By way of example, the non-actinide Group IIIA elements may be or include elements such as, for instance, scandium, yttrium, terbium, dysprosium, holmium, erbium, thulium, ytterbium and lutetium or combinations thereof. First transition layer 108 may be protected by second transition layer 110. Second transition layer 110 may be fabricated of a variety of materials which, for instance, may be or include a material similar to the first transition layer, with (for instance) a thickness of about 10 to 250 μm. In another embodiment, second transition layer 110 may include or be fabricated of alkaline-earth aluminosilicate such as, for instance, barium strontium aluminosilicate (($Ba, Sr)Si_2Al_2O_8$, commonly referred to as BSAS. Third transition layer 111 may be fabricated of a variety of materials which, for instance, may be or include rare earth disilicate ($RE_2Si_2O_7$), with the rare earth elements being chosen from a group consisting of one or more non-actinide Group IIIA elements. Note that, in one embodiment, the one or more transition layers 108, 110, 111 may have a coefficient of thermal expansion that is substantially close to a coefficient of thermal expansion of the underlying layers, and in particular, substrate 102. In one example, the one or more transition layers may have a coefficient of thermal expansion within a range of about 3.5 to 71° C. Alternately, protective coating 104 may also include one or more layers which, for instance, include a bond coat layer and one or more transition layers, lacking BSAS, as described in U.S. patent Ser. No. 14/204,367, the entire contents of which are incorporated herein by reference.

Continuing further with FIG. 1A, recession resistant surface layer 112 may further be provided over one or more transition layers 108, 110, 111. Recession resistant surface layer 112 may, for instance, be chemically compatible with the underlying layers and may also be resistant to reactive species such as, for instance, water vapor. As an example, recession resistant surface layer 112 may include rare earth silicate such as, for instance, rare earth monosilicate ($RE_2SiO_5$), with the rare earth elements being chosen from a group consisting of one or more non-actinide Group IIIA elements.

Figure 1B:
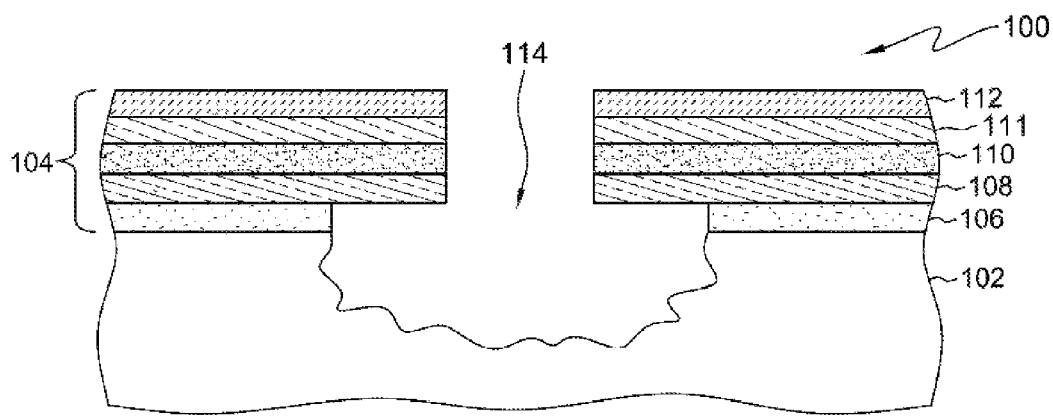
FIG. 1B depicts the structure of FIG. 1A with a cavity disposed within the silicon-based substrate, in accordance with one or more aspects of the present disclosure.

FIG. 1B depicts the structure of FIG. 1A with cavity 114 being disposed within protective coating 104 and silicon-based substrate 102, in accordance with one or more aspects of the present disclosure. By way of example, as described above, localized spallation and/or pinhole defects may occasionally occur within protective coating 104 during manufacturing or operation. These defects may result in cavity 114 within silicon substrate 102. In one embodiment, the size of the cavity may depend upon parameters such as, for instance, material of substrate 102, the operating environment, and/or the time before discovery.

Figure 1C:
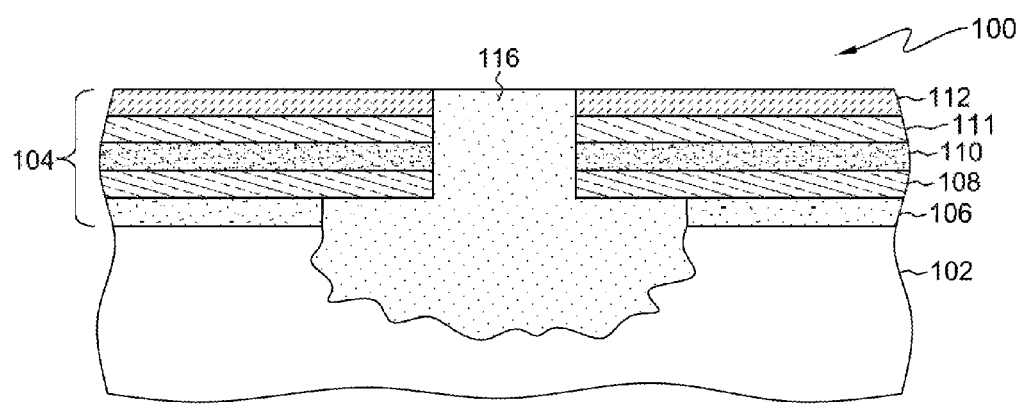
FIG. 1C depicts the structure of FIG. 1B with a patch formulation disposed within the cavity thereof, in accordance with one or more aspects of the present disclosure.

FIG. 1C depicts the structure of FIG. 1B with a silicon-based patch formulation 116 disposed within cavity 114 (FIG. 1B) of structure 100, in accordance with one or more aspects of the present disclosure. By way of example, the patch formulation may be or include, for instance, about 25 to 66 percent by volume of a solvent, about 4 to 10 percent by volume of a silicon-comprising binding material, and about 30 to 65 percent by volume of a patching material. In a specific example, the patch formulation may be or include, for instance, 38.1 percent by volume of a solvent, 5.9 percent by volume of silicon-comprising binding material, and 56 percent by volume of patching material, where the molar ratio of non-actinide Group IIIA element to silicon within the silicon-based patch formulation is 1.025.

By way of example, the patching material may be or include particles having one or more non-actinide Group IIIA elements which, for instance, may include or be chosen from a rare earth monosilicate ($RE_2SiO_5$) and a rare earth disilicate ($RE_2Si_2O_7$). Note that, in one example, the rare earth elements may be chosen from a group consisting of scandium, yttrium, terbium, dysprosium, holmium, erbium, thulium, ytterbium and lutetium or combinations thereof. In a specific example, the patching material may be yttrium disilicate (YDS), ytterbium mono silicate (YMS), yttrium ytterbium disilicate (YbYDS) or combinations thereof.

In one embodiment, the patching material may have a multi-modal particle size distribution of particles having non-actinide Group IIIA elements, in particular, a bimodal particle size distribution. As used herein, the multi-modal particle size distribution refers to a patching material having a collection of particles with one or more distinct distributions of particle sizes and containing non-actinide Group IIIA elements, where a subcollection of each distinct distribution has substantially uniform particle size. For instance, a bimodal particle size distribution refers to a collection of particles with two distinct distributions of particles sizes. In one example, as illustrated by the particle size distribution graph of FIG. 2, the two distinct distributions of particle sizes may be, for instance, coarse particle sizes of non-actinide Group IIIA elements provided according to a particle size distribution having peak B and fine particle sizes provided according to a particle size distribution having peak A. For instance, the horizontal axis of FIG. 2 shows particle sizes (μm) of the non-actinide materials, and the vertical axis shows frequencies (%) of the non-actinide materials. Note that, in this example, although the two distributions have been shown to overlap and have substantially equal peak heights, one skilled in the art will know that two distributions may also be distinct and have substantially different peak heights. In one example, the coarse particle sizes may have a peak particle size within a range of about 10 to 50 μm and fine particle sizes may have a peak particle size within a range of about 0.5 to 10 μm. Further, as described above, the total volume fraction of solids having two distinct distributions of particle sizes may be about 30 to 65 percent by volume of a patching material, of which the volume fraction of coarse particle sizes distributed within the volume fraction of solids may be fewer than 80 percent of the patching material, while the volume fraction of fine particle sizes may be fewer than 80 percent of the patching material, with the amounts of coarse and fine particles summing to substantially 100% of the patching material solid particles. In a specific example, the volume fraction of coarse particle sizes distributed within the volume fraction of solids may be fewer than 70 percent of the patching material, while the volume fraction of fine particle sizes may be fewer than 70 percent of the patching material, with the amounts of coarse and fine particles summing to substantially 100% of the patching material solid particles. In another specific example, the volume fraction of coarse particle sizes distributed within the volume fraction of solids may be fewer than 60 percent of the patching material, while the volume fraction of fine particle sizes within the total volume fraction of solids may be fewer than 60 percent of the patching material, with the amounts of coarse and fine particles summing to substantially 100% of the patching material solid particles.

In another aspect, the patching material may have a trimodal particle size distribution of particles having non-actinide Group IIIA elements. As used herein, a trimodal particle size distribution refers to a collection of particles with three distinct distributions of particle sizes. In one example, as illustrated by the particle size distribution graph of FIG. 3, the three distinct distributions of particle sizes may be, for instance, coarse particle sizes of non-actinide Group IIIA materials provided according to a particle size distribution having peak C, medium particle sizes provided according to a particle size distribution having peak B and fine particle sizes provided according to a particle size distribution having peak A. As discussed above in connection with FIG. 2, the horizontal axis of FIG. 3 shows particle sizes (μm) of the non-actinide materials, and the vertical axis shows frequencies (%) of the non-actinide containing materials. Note that, in this example, although the three distributions have been shown to overlap with equal peak heights, one skilled in the art will know that three distributions may also be distinct and have substantially different peak heights. In such an example, the coarse particle sizes may have a peak particle size within a range of about 10 to 50 μm, a medium particle sizes may have a peak particle size within a range of about 5 to 15 μm, and a fine particle sizes may have a peak particle size within a range of about 0.5 to 5 μm. Further, as described above, the total volume fractions of solids having three distinct distributions of particle sizes may be about 30 to 65 percent by volume of a patching material, of which the volume fraction of coarse particle sizes may be fewer than 80 percent of the patching material, the volume fraction of medium particle sizes may be fewer than 50 percent of the patching material, and the volume fraction of fine particle sizes may be fewer than 50 percent of the patching material, with these amounts of coarse, medium and fine particles summing to substantially 100% of the patching material solid particles. In a specific example, the volume fraction of coarse particle sizes within the total volume fraction of solids may be fewer than 70 percent of the patching material, the volume fraction of medium particle sizes may be fewer than 40 percent of the patching material, and the volume fraction of fine particle sizes may be fewer than 40 percent of the patching material, with these amounts of coarse, medium and fine particles summing to substantially 100% of the patching material solid particles. In another specific example, the volume fraction of coarse particle sizes distributed within the total volume fraction of solids may be fewer than 60 percent of the patching material, the volume fraction of medium particle sizes within the total volume fraction of solids may be fewer than 30 percent of the patching material, and the volume fraction of fine particle sizes within the total volume fraction of solids may be fewer than 30 percent of the patching material, with these amounts of coarse, medium and fine particles summing to substantially 100% of the patching material solid particles. In a specific example, the volume fraction of coarse particle sizes distributed within the total volume fraction of solids may be about 52 percent of the patching material, the volume fraction of medium particle sizes may be about 23 percent of the patching material, and the volume fraction of fine particle sizes may be about 25 percent of the patching material.

Further, the binding material of the patch formulation may be or include a silicon-based resin material such as, for instance, cross-linked polyorganosiloxane resin. In one example, the cross-linked polyorganosiloxane resin may include, but not limited to, for instance, silicone resin DOW Corning® 249 Flake resin (available from DOW Chemical) which for instance, may include phenyl and methyl silsesquioxanes and methyl siloxanes. In addition, the solvent may be or include an organic solvent which, in one embodiment, facilitates dissolving of the silicon-based binding material. In one example, the organic solvent is chosen from a group consisting of methanol, ethanol, butanol, propanol, pentanol, hexanol, octanol, nonanol, decanol and dodecanol. In a specific example, the organic solvent, such as butanol dissolves silicone resin to form liquid mixtures having a viscosity within a range of about 5 to 150 Pa·s at 25° C.

Continuing further with FIG. 1C, the structure may optionally be subjected to one or more processing steps to stabilize the patch formulation. In one example, the stabilizing of the patch formulation may be accomplished by, for instance, heating the structure at a temperature of about 500° C. or less for a duration of about 10 mins. Such heating processes facilitate evaporating volatile organic solvents and/or partially oxidizing silicon-based binding materials, thereby stabilizing the patch formulation. This, in turn, modulates viscosity of the resultant patch formulation such that the formulation remains within cavity 114 (FIG. 1B) without any loss of the material, notwithstanding the high temperatures of gas-turbine environments.

Figure 1D:
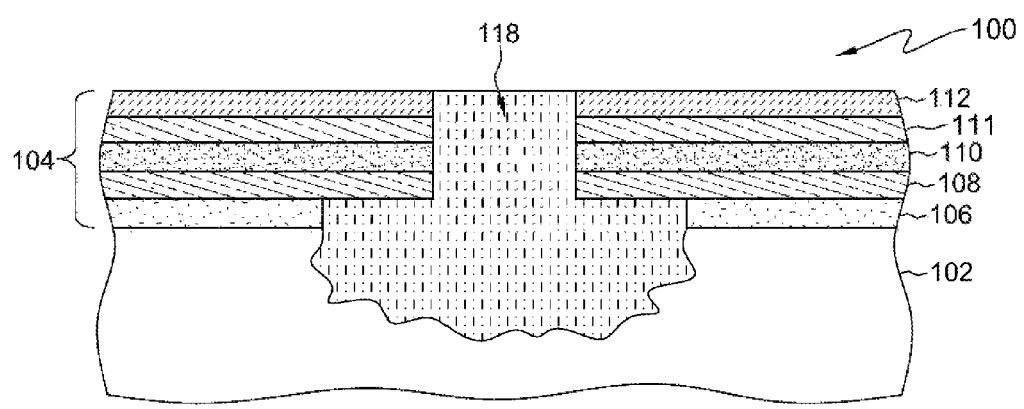
FIG. 1D depicts the structure of FIG. 1C with an environmentally resistant patch material disposed within the cavity thereof, in accordance with one or more aspects of the present disclosure.

Referring to FIG. 1D, structure 100 may be subjected to one or more curing processes to facilitate forming a silicon-based environmentally resistant patch 118 within cavity 114 (FIG. 1B) of the structure. In this embodiment, the one or more curing processes may be performed by heating the structure at, for instance, a gas-turbine operation conditions to facilitate oxidizing the silicon-comprising binding material to silica and/or oxidizing the patching material, resulting in environmentally resistant patch 118. In one example, the resultant environmentally resistant patch may be or include about 2 to 10 percent by volume of cured binding material such as, for instance, silica, and about 90 to 98 percent by volume of cured patching material. In this example, the cured patching material may be or include particles having one or more non-actinide Group IIIA elements which, for instance, may include or be chosen from a rare earth monosilicate ($RE_2SiO_5$) and a rare earth disilicate ($RE_2Si_2O_7$). Note that, in one embodiment, the molar ratio of silicon (for instance, from silica) to non-actinide Group IIIA element (for instance, from cured patching material) within the resultant environmentally resistant patch is about 0.95 to 1.25. Further, note also that the silicon-based environmentally resistant patch, when subjected to the high turbine operating temperatures, may undergo transitions that allow the individual chemical components of the resultant environmentally resistant patch to homogenize and transform in phase composition shape and size.

Further, note that, although the process parameters employed during the curing processes facilitate oxidizing the patching material, the multi-modal particle size distribution of the cured patching material remains undisturbed. For instance, in one embodiment, the cured patching material may have a multi-modal particle size distribution of particles having non-actinide Group IIIA material(s), in particular, a bimodal particle size distribution or a trimodal particle size distribution, as described above in connection with FIG. 1C. Additionally, note that resultant environmentally resistant patch 118 has been designed to possess desired characteristics such as, for instance, adhesive strength, coefficient of thermal expansion (CTE), packing density, and/or a chemical composition that protects structure 100 from environmental degradation, such as by water vapor induced recession. For instance, resultant environmentally resistant patch 118 may have an adhesive strength of about 3 MPa and a coefficient of thermal expansion of about 3.5 to 7 ppm/° C.

Those skilled in the art will note that, advantageously, the silicon-based patch formulation and the resultant silicon-based environmentally resistant patch have been designed to provide enhanced characteristics for use with, for instance, high temperature components of gas turbine engines. For instance, these enhanced characteristics include better strength after a low temperature cure, resistance to thermal shock during the initial engine start, strength at the engine operating temperature and retention of a porous structure to permit the escape of gases produced by the oxidation of silicon-comprising substrates. Further, the patch formulation and the resultant environmentally resistant patch material are designed to be compatible with overlying protecting coatings such as environmental barrier coatings (EBC) and the underlying silicon-comprising substrates.

Approximating language, as used herein throughout the specification and claims, can be applied to modify any quantitative representation that could permissibly vary without resulting in a change in the basic function to which it is related. Accordingly, a value modified by a term or terms, such as "about" is not to be limited to the precise value specified. In some instances, the approximating language can correspond to the precision of an instrument for measuring the value. Here and throughout the specification and claims, range limitations can be combined and/or interchanged; such ranges are identified and include all the sub-ranges contained therein unless context or language indicates otherwise. While the present disclosure has been described with reference to a number of specific embodiments, it will be understood that the true spirit and scope of the disclosure should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A silicon-based patch formulation comprising:
about 25 to 66 percent by volume of a solvent;
about 4 to 10 percent by volume of a silicon-comprising binding material; and
about 30 to 65 percent by volume of a patching material, the patching material comprising particles having one or more non-actinide Group IIIA elements, wherein a molar ratio of the one or more non-actinide Group IIIA elements to silicon within the silicon-based patch formulation is about 0.95 to 1.25, wherein the particles having one or more non-actinide Group IIIA elements have at least a bimodal particle size distribution, wherein a particle size of a peak of a first distribution is greater than a particle size of a peak of a second distribution.

2. The silicon-based patch formulation of claim 1, wherein a volume fraction of the first distribution comprises fewer than 80 percent of the patching material and a volume fraction of the second distribution comprises fewer than 80 percent of the patching material, wherein a volume fraction of the first and the second distributions comprises substantially 100% of the patching material.

3. The silicon-based patch formulation of claim 1, wherein a volume fraction of the first distribution comprises fewer than 60 percent of the patching material and a volume fraction of the second distribution comprises fewer than 60 percent of the patching material, wherein a volume fraction of the first and the second distributions comprises substantially 100% of the patching material.

4. The silicon-based patch formulation of claim 1, wherein the particle size of the first distribution is within a range of about 10 to 50 μm, and the particle size of the second distribution is within a range of about 0.5 to 10 μm.

5. The silicon-based patch formulation of claim 1, wherein the particles having one or more non-actinide Group IIIA elements have at least a trimodal particle size distribution, wherein a particle size of a peak of a first distribution is greater than a particle size of a peak of a second distribution, the particle size of the peak of the second distribution is greater than a particle size of a peak of a third distribution.

6. The silicon-based patch formulation of claim 5, wherein a volume fraction of the first distribution comprises fewer than 80 percent of the patching material, a volume fraction of the second distribution comprises fewer than 50 percent of the patching material, and a volume fraction of the third distribution comprises fewer than 50 percent of the patching material, wherein a volume fraction of the first, the second and the third distributions comprises substantially 100% of the patching material.

7. The silicon-based patch formulation of claim 5, wherein a volume fraction of the first distribution comprises fewer than 60 percent of the patching material, a volume fraction of the second distribution comprises fewer than 30 percent of the patching material, and a volume fraction of the third distribution comprises fewer than 30 percent of the patching material, wherein a volume fraction of the first, the second and the third distributions comprises substantially 100% of the patching material.

8. The silicon-based patch formulation of claim 4, wherein the particle size of the first distribution is within a range of about 10 to 50 μm, the particle size of the second distribution is within a range of about 5 to 15 μm, and the particle size of the third distribution is within as range of about 0.5 to 5 μm.

9. The silicon-based patch formulation of claim 1, wherein the solvent comprises an organic solvent which facilitates dissolution of the silicon-comprising binding, material.

10. The silicon-based patch formulation of claim 9, wherein the organic solvent is chosen from a group consisting of methanol, ethanol, butanol, propanol, pentanol, hexanol, octanol, nonanol, decanol, dodecanol.

11. The silicon-based patch formulation of claim 1, wherein the binding material comprises a cross-linked polyorganosiloxane resin.

12. The silicon-based patch formulation of claim 1, wherein the particles having one or more non-actinide Group IIIA elements comprise one or more rare earth materials selected from a group consisting of a rare earth (RE) monosilicate ($RE_2SiO_5$) and a rare earth disilicate ($RE_2Si_2O_7$), wherein the rare earth material is chosen from a group consisting of non-actinide Group IIIA elements.

13. A silicon-based environmentally resistant patch comprising:
   about 2 to 10 percent by volume of a cured silicon-comprising binding material;
   about 90 to 98 percent by volume of a cured patching material wherein the cured patching material comprises particles having one or more non-actinide Group IIIA elements; and wherein a molar ratio of the one or more non-actinide Group IIIA elements to silicon within the silicon-based environmentally resistant patch is about 0.95 to 1.25, wherein the particles having one or more non-actinide Group IIIA elements comprise one or more rare earth materials selected from a group consisting of a rare earth (RE) monosilicate ($RE_2SiO_5$) and a rare earth disilicate ($RE_2Si_2O_7$), and wherein the rare earth material is chosen from a group consisting of non-actinide Group IIIA elements.

14. The silicon-based environmentally resistant patch of claim 13, wherein the particles having one or more non-actinide Group IIIA elements have at least a bimodal particle size distribution, wherein a particle size of a peak of a first distribution is greater than a particle size of a peak of second distribution.

15. The silicon-based environmentally resistant patch of claim 14, wherein a volume fraction of the first distribution comprises fewer than 60 percent of the cured patching material and the volume fraction of the second distribution comprises fewer than 60 percent of the cured patching material, wherein a volume fraction of the first and the second distributions comprises substantially 100% of the patching material.

16. The silicon-based environmentally resistant patch of claim 14, wherein the particle size of the first distribution is within a range of about 10 to 50 pin, and the particle size of the second distribution is within a range of about 0.5 to 10 μm.

17. The silicon-based environmentally resistant patch of claim 13, wherein the particles having one or more non-actinide Group IIIA elements have at least a trimodal particle size distribution, wherein a particle size of a peak of a first distribution is greater than a particle size of a peak of a second distribution, the particle size of the peak of the second distribution is greater than a particle size of a peak of a third distribution.

18. The silicon-based environmentally resistant patch of claim 17, wherein a volume fraction of the first distribution comprises fewer than 60 percent of the cured patching material, a volume fraction of the second distribution comprises fewer than 30 percent of the cured patching material, and a volume fraction of the third distribution comprises fewer than 30 percent of the cured patching material, wherein a volume fraction of the first, the second and the third distributions comprises substantially 100% of the patching material.

19. The silicon-based environmentally resistant patch of claim 17, wherein the particle size of the first distribution is within a range of about 10 to 50 μm, the particle size of the second distribution is within a range of about 5 to 15 μm, and the particle size of the third distribution is within a range of about 0.5 to 5 μm.

20. The silicon-based environmentally resistant patch of claim 13, wherein the cured silicon-comprising binding material comprises a cured cross-linked polyorganosiloxane resin, the cured cross-linked polyorganosiloxane resin comprising silica.

21. The silicon-based environmentally resistant patch of claim 13, wherein the patch has an adhesive strength of at least about 3 MPa and a coefficient of thermal expansion of about 3.5 to 7 ppm/° C.

* * * * *